United States Patent
Rong et al.

(10) Patent No.: US 9,853,691 B2
(45) Date of Patent: Dec. 26, 2017

(54) NEAR FIELD COMMUNICATION TECHNOLOGY-BASED TERMINAL APPLICATION CONTROL METHOD, APPARATUS, AND SYSTEM

(71) Applicant: Huawei Technologies Co., Ltd., Shenzhen (CN)

(72) Inventors: Shengkai Rong, Shanghai (CN); Chunqi Wang, Shanghai (CN); Sheng Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/322,804

(22) PCT Filed: Jul. 10, 2014

(86) PCT No.: PCT/CN2014/081989
§ 371 (c)(1),
(2) Date: Dec. 29, 2016

(87) PCT Pub. No.: WO2016/004602
PCT Pub. Date: Jan. 14, 2016

(65) Prior Publication Data
US 2017/0134070 A1    May 11, 2017

(51) Int. Cl.
*H04B 5/00* (2006.01)
*H04B 5/02* (2006.01)
*G06F 9/54* (2006.01)

(52) U.S. Cl.
CPC ........... *H04B 5/0031* (2013.01); *G06F 9/541* (2013.01); *H04B 5/02* (2013.01)

(58) Field of Classification Search
CPC ................................ H04B 5/0031; H04B 5/02
See application file for complete search history.

(56) References Cited

U.S. PATENT DOCUMENTS

| | | | |
|---|---|---|---|
| 2013/0035063 A1 | 2/2013 | Fisk et al. | |
| 2013/0035117 A1 | 2/2013 | Litkouhi et al. | |
| 2013/0295908 A1 | 11/2013 | Zeinstra et al. | |
| 2014/0124580 A1 | 5/2014 | Yang et al. | |
| 2015/0044964 A1* | 2/2015 | Khan | G06F 21/35 455/41.1 |

FOREIGN PATENT DOCUMENTS

| | | |
|---|---|---|
| CN | 102917004 A | 2/2013 |
| CN | 102917115 A | 2/2013 |
| CN | 103167106 A | 6/2013 |

(Continued)

OTHER PUBLICATIONS

Machine Translation and Abstract of Chinese Publication No. CN103167106, dated Jun. 19, 2013, 9 pages.

(Continued)

*Primary Examiner* — Tuan H Nguyen
(74) *Attorney, Agent, or Firm* — Conley Rose, P.C.

(57) ABSTRACT

A near field communication technology-based terminal application control method, an apparatus, and a system relate to the communications field for performing an enable and disable operations on a particular application on a mobile terminal based on an NFC technology.

14 Claims, 10 Drawing Sheets

(56) References Cited

FOREIGN PATENT DOCUMENTS

CN 103327478 * 9/2013 ............... H04B 5/00

OTHER PUBLICATIONS

Foreign Communication From a Counterpart Application, European Application No. 14897324.1, Extended European Search Report dated May 24, 2017, 10 pages.
Foreign Communication From a Counterpart Application, PCT Application No. PCT/CN2014/081989, English Translation of International Search Report dated Mar. 30, 2015, 2 pages.
Foreign Communication From a Counterpart Application, PCT Application No. PCT/CN2014/081989, English Translation of Written Opinion dated Mar. 30, 2015, 8 pages.

* cited by examiner

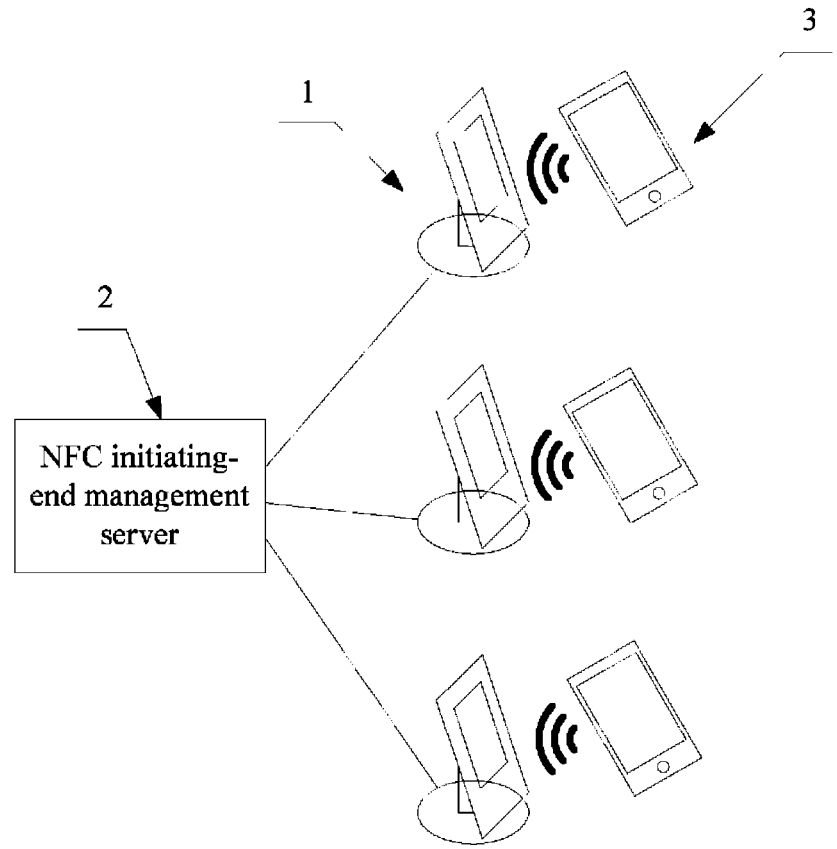

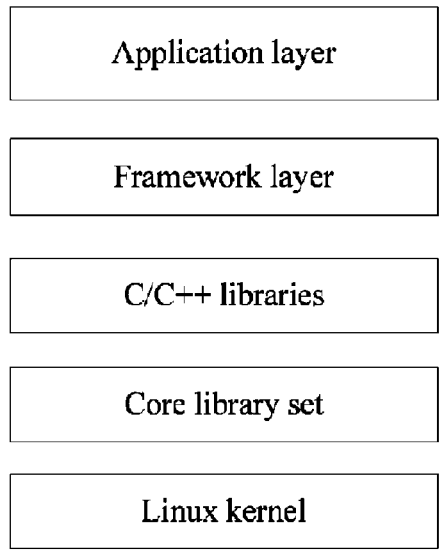

FIG. 5

| An NFC initiating-end device obtains application control information, where the application control information includes an application identifier used to indicate an application type and an operation indication used to indicate an enable or disable operation | ⟋ S301 |

| The NFC initiating-end device sends the application control information to an NFC receive-end when determining that the NFC receive-end device is in signal coverage of the NFC initiating-end device, so that the NFC receive-end device parses the application control information, and performs an enable or disable operation on the application type according to the application identifier and the operation indication | ⟋ S302 |

| The NFC initiating-end device receives application control complete information sent by the NFC receive-end device | ⟋ S303 |

FIG. 6

NEAR FIELD COMMUNICATION TECHNOLOGY-BASED TERMINAL APPLICATION CONTROL METHOD, APPARATUS, AND SYSTEM

CROSS-REFERENCE TO RELATED APPLICATIONS

This application is a National Stage of International Application No. PCT/CN2014/081989, filed on Jul. 10, 2014, which is hereby incorporated by reference in its entirety.

TECHNICAL FIELD

The present disclosure relates to the communications field, and in particular, to a near field communication technology-based terminal application control method, an apparatus, and a system.

BACKGROUND

A near field communication (NFC) technology is a short-distance contactless identification and interconnection technology, and implements short-distance communication between electronic devices by using magnetic induction.

With gradual popularization of the NFC technology, an NFC function is integrated into many devices. As shown in FIG. 1, NFC devices generally include an NFC initiating-end device 1, an NFC initiating-end management server 2, and an NFC receive-end device 3. The NFC initiating-end management server 2 is interconnected to one or more NFC initiating-end devices 1 in a wired network manner and is configured to manage each NFC initiating-end device 1. When spaced apart by a specified short distance, the NFC initiating-end device 1 and the NFC receive-end device 3 communicate with each other by using an NFC protocol.

The current NFC technology mainly has three functions: card emulation, a read/write card, and Peer to Peer (P2P), and another function is still under further study and exploration.

Currently, many places and enterprises impose particular special requirements, for example, no photo-taking, no network service enabled, and no call, on a status of a mobile phone entering a particular area. A current resolution manner is just to require, in a quite rude manner, a user to switch off a mobile phone or to confiscate a mobile phone temporarily. If the user is required to switch off the mobile phone, the user may switch on the mobile phone at any time, and consequently, an objective of managing the mobile phone status is not achieved. Directly confiscating the mobile phone is not readily accepted by the user.

SUMMARY

Embodiments of the present disclosure provide a near field communication technology-based terminal application control method, an apparatus, and a system, so that an enable (Enable) or disable (Disable) operation can be performed on a particular application on a mobile terminal (that is, an NFC receive-end device) based on an NFC technology.

To achieve the foregoing objective, the following technical solutions are used in the embodiments of the present disclosure.

A first aspect of the present disclosure provides a near field communication technology-based terminal application control method, including receiving, by a near field communication NFC receive-end device in signal coverage of an NFC initiating-end device, application control information sent by the NFC initiating-end device, where the application control information includes an application identifier used to indicate an application type and an operation indication used to indicate an enable or disable operation; and parsing, by the NFC receive-end device, the application control information, and performing an enable or disable operation on the application type according to the application identifier and the operation indication.

In a first possible implementation manner, according to the near field communication technology-based terminal application control method in the first aspect, the application control information further includes a preset time limit value; and after the performing an enable or disable operation on the application type, the method further includes obtaining, by the NFC receive-end device, a first time value, where the first time value is a difference between a current time and a time at which the NFC receive-end device completes the disable operation performed on the application type; determining, by the NFC receive-end device, whether the first time value is greater than or equal to the preset time limit value; and if the first time value is greater than or equal to the preset time limit value and an application indicated by the application identifier is still in a disabled state, performing, by the NFC receive-end device, an enable operation on the application indicated by the application identifier.

In a second possible implementation manner, with reference to the first aspect or the first possible implementation manner, the performing, by the NFC receive-end device, an enable or disable operation on the application type according to the application identifier and the operation indication includes calling, by the NFC receive-end device, a corresponding application programming interface (API) in an operating system of the NFC receive-end device according to the application identifier and the operation indication, and performing the enable or disable operation on the application type.

In a third possible implementation manner, with reference to the second possible implementation manner, the parsing, by the NFC receive-end device, the application control information, calling a corresponding API in an operating system of the NFC receive-end device according to the application identifier and the operation indication, and performing the enable or disable operation on the application type includes parsing, by the NFC receive-end device, the application control information, and searching, according to the application identifier, for an API that is corresponding to the application indicated by the application identifier and that is in the operating system of the NFC receive-end device; and enabling, by the NFC receive-end device, the API at a framework layer if the operation indication indicates an enable operation, so that the NFC receive-end device performs the enable operation on the application indicated by the application identifier; or disabling, by the NFC receive-end device, the API at a framework layer if the operation indication indicates a disable operation, so that the NFC receive-end device performs the disable operation on the application indicated by the application identifier.

In a fourth possible implementation manner, with reference to the second possible implementation manner, the parsing, by the NFC receive-end device, the application control information, calling a corresponding API in an operating system of the NFC receive-end device according to the application identifier and the operation indication, and performing the enable or disable operation on the application type includes: parsing, by the NFC receive-end device, the application control information, and searching, according to the application identifier, for an API that is corresponding to the application indicated by the application identifier and that is in the operating system of the NFC receive-end device; and calling, by the NFC receive-end device, the corresponding application programming interface API in the operating system of the NFC receive-end device, and performing, at an application layer on the application indicated by the application identifier, the enable or disable operation indicated by the operation indication.

In a fifth possible implementation manner, with reference to the first aspect or the first possible implementation manner to the fourth possible implementation manner, after the performing an enable or disable operation on the application type, the method further includes sending, by the NFC receive-end device, application control complete information to the NFC initiating-end device, where the application control complete information is used to indicate that the NFC receive-end device completes the enable or disable operation performed on the application type.

A second aspect of the present disclosure further provides a near field communication technology-based terminal application control method, including obtaining, by an NFC initiating-end device, application control information, where the application control information includes an application identifier used to indicate an application type and an operation indication used to indicate an enable or disable operation; and sending, by the NFC initiating-end device, the application control information to an NFC receive end when determining that the NFC receive-end device is in signal coverage of the NFC initiating-end device, so that the NFC receive-end device parses the application control information, calls a corresponding API in an operating system of the NFC receive-end device according to the application identifier and the operation indication, and performs an enable or disable operation on the application type.

In a first possible implementation manner, with reference to the second aspect, the application control information further includes a preset time limit value.

In a second possible implementation manner, with reference to the second aspect or the first possible implementation manner, after the NFC initiating-end device sends the application control information to the NFC receive-end device, the method further includes receiving, by the NFC initiating-end device, application control complete information sent by the NFC receive-end device, where the application control complete information is used to indicate that the NFC receive-end device completes the enable or disable operation performed on the application type.

A third aspect of the present disclosure provides an NFC receive-end device, where the NFC receive-end device includes a receiving module, configured to receive, in signal coverage of an NFC initiating-end device, application control information sent by the NFC initiating-end device, where the application control information includes an application identifier used to indicate an application type and an operation indication used to indicate an enable or disable operation; and an execution module, configured to parse the application control information, and perform an enable or disable operation on the application type according to the application identifier and the operation indication.

In a first possible implementation manner, according to the third aspect, the application control information further includes a preset time limit value, and the NFC receive-end device further includes an obtaining module, configured to obtain a first time value after the execution module performs the enable or disable operation on the application type, where the first time value is a difference between a current time and a time at which the execution module completes the disable operation performed on the application type; and a determining module, configured to determine whether the first time value is greater than or equal to the preset time limit value; and the execution module is further configured to, if the first time value is greater than or equal to the preset time limit value and an application indicated by the application identifier is still in a disabled state, perform an enable operation on the application indicated by the application identifier.

In a second possible implementation manner, according to the third aspect or the first possible implementation manner, the execution module is configured to call a corresponding API in an operating system of the NFC receive-end device according to the application identifier and the operation indication, and perform the enable or disable operation on the application type.

In a third possible implementation manner, with reference to the second possible implementation manner, the execution module includes a parsing module, configured to parse the application control information; a search module, configured to search, according to the application identifier, for an API that is corresponding to the application indicated by the application identifier and that is in the operating system of the NFC receive-end device; and a control module, configured to enable the API at a framework layer if the operation indication indicates an enable operation, so that the NFC receive-end device performs the enable operation on the application indicated by the application identifier; or disable the API at a framework layer if the operation indication indicates a disable operation, so that the NFC receive-end device performs the disable operation on the application indicated by the application identifier.

In a fourth possible implementation manner, with reference to the second possible implementation manner, the execution module includes a parsing module, configured to parse the application control information; a search module, configured to search, according to the application identifier, for an API that is corresponding to the application indicated by the application identifier and that is in the operating system of the NFC receive-end device; and a control module, configured to: call the corresponding application programming interface API in the operating system of the NFC receive-end device, and perform the enable or disable operation on the application type at an application layer.

In a fifth possible implementation manner, with reference to the third aspect or the first possible implementation manner to the fourth possible implementation manner, the NFC receive-end device further includes a sending module, configured to send application control complete information to the NFC initiating-end device after the execution module performs the enable or disable operation on the application type, where the application control complete information is used to indicate that the NFC receive-end device completes the enable or disable operation performed on the application type.

A fourth aspect of the present disclosure provides an NFC initiating-end device, where the NFC initiating-end device includes: an obtaining module, configured to obtain application control information, where the application control information includes an application identifier used to indicate an application type and an operation indication used to indicate an enable or disable operation; and a sending module, configured to send the application control information to an NFC receive end when it is determined that the NFC receive-end device is in signal coverage of the NFC initiating-end device, so that the NFC receive-end device parses the application control information, and performs an enable or disable operation on the application type according to the application identifier and the operation indication.

In a first possible implementation manner, according to the fourth aspect, the application control information further includes a preset time limit value.

In a second possible implementation manner, according to the fourth aspect or the first possible implementation manner, the NFC initiating-end device further includes a receiving module, configured to, after the sending module sends the application control information to the NFC receive-end device, receive application control complete information sent by the NFC receive-end device, where the application control complete information is used to indicate that the NFC receive-end device completes the enable or disable operation performed on the application type.

A fifth aspect of the present disclosure provides an NFC receive-end device, where the NFC receive-end device includes a receiver, configured to receive, in signal coverage of an NFC initiating-end device, application control information sent by the NFC initiating-end device, where the application control information includes an application identifier used to indicate an application type and an operation indication used to indicate an enable or disable operation; and a processor, configured to parse the application control information, and perform an enable or disable operation on the application type according to the application identifier and the operation indication.

In a first possible implementation manner, according to the fifth aspect, the application control information further includes a preset time limit value; the receiver is further configured to obtain a first time value after the processor performs the enable or disable operation on the application type, where the first time value is a difference between a current time and a time at which the execution module completes the disable operation performed on the application type; and the processor is further configured to determine whether the first time value is greater than or equal to the preset time limit value; and if the first time value is greater than or equal to the preset time limit value and an application indicated by the application identifier is still in a disabled state, perform an enable operation on the application indicated by the application identifier.

In a second possible implementation manner, with reference to the fifth aspect or the first possible implementation manner, the processor is configured to call a corresponding API in an operating system of the NFC receive-end device according to the application identifier and the operation indication, and perform the enable or disable operation on the application type.

In a third possible implementation manner, with reference to the second possible implementation manner, the processor is configured to parse the application control information; search, according to the application identifier, for an API that is corresponding to the application indicated by the application identifier and that is in the operating system of the NFC receive-end device; and enable the API at a framework layer if the operation indication indicates an enable operation, so that the NFC receive-end device performs the enable operation on the application indicated by the application identifier; or disable the API at a framework layer if the operation indication indicates a disable operation, so that the NFC receive-end device performs the disable operation on the application indicated by the application identifier.

In a fourth possible implementation manner, with reference to the second possible implementation manner, the processor is configured to parse the application control information; search, according to the application identifier, for an API that is corresponding to the application indicated by the application identifier and that is in the operating system of the NFC receive-end device; call the corresponding API in the operating system of the NFC receive-end device; and perform the enable or disable operation on the application type at an application layer.

In a fifth possible implementation manner, with reference to the fifth aspect or the first possible implementation manner to the fourth possible implementation manner, the NFC receive-end device further includes a transmitter, configured to send application control complete information to the NFC initiating-end device after the processor performs, on the application indicated by the application identifier, the enable or disable operation indicated by the operation indication, where the application control complete information is used to indicate that the NFC receive-end device completes the enable or disable operation performed on the application type.

A sixth aspect of the present disclosure provides an NFC initiating-end device, where the NFC initiating-end device includes a receiver, configured to obtain application control information, where the application control information includes an application identifier used to indicate an application type and an operation indication used to indicate an enable or disable operation; and a transmitter, configured to send the application control information to an NFC receive end when it is determined that the NFC receive-end device is in signal coverage of the NFC initiating-end device, so that the NFC receive-end device parses the application control information, and performs an enable or disable operation on the application type according to the application identifier and the operation indication.

In a first possible implementation manner, according to the sixth aspect, the application control information further includes a preset time limit value.

In a second possible implementation manner, according to the sixth aspect or the first possible implementation manner, the receiver is further configured to, after the transmitter sends the application control information to the NFC receive-end device, receive application control complete information sent by the NFC receive-end device, where the application control complete information is used to indicate that the NFC receive-end device completes the enable or disable operation performed on the application type.

A seventh aspect of the present disclosure provides a security classification changing system, including the NFC receive-end device described in the third aspect and the NFC initiating-end device described in the fourth aspect.

An eighth aspect of the present disclosure provides a security classification changing system, including the NFC receive-end device described in the fifth aspect and the NFC initiating-end device described in the sixth aspect.

According to the near field communication technology-based terminal application control method, the apparatus, and the system provided in the embodiments of the present disclosure, an NFC receive-end device receives, in signal coverage of an NFC initiating-end device, application control information sent by the NFC initiating-end device, where the application control information includes an application identifier used to indicate an application type and an operation indication used to indicate an enable or disable operation; and the NFC receive-end device parses the application control information and performs an enable or disable operation on the application type according to the application identifier and the operation indication.

Based on descriptions of the foregoing embodiments, in the present disclosure, an NFC receive-end device can receive application control information sent by an NFC initiating-end device, where the application control information includes an application identifier used to indicate an application type and an operation indication used to indicate an enable or disable operation, so that the NFC receive-end device performs an enable or disable operation on the application type according to the application identifier and the operation indication that are obtained by parsing the application control information. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

FIG. 1 is a structural composition diagram of an NFC device in the prior art;

FIG. 2 is a schematic flowchart of a near field communication technology-based terminal application control method according to Embodiment 1 of the present disclosure;

FIG. 5 is a system architecture diagram of an NFC receive-end device according to an embodiment of the present disclosure;

FIG. 6 is a schematic flowchart of a near field communication technology-based terminal application control method according to Embodiment 3 of the present disclosure;

DESCRIPTION OF EMBODIMENTS

Figure 3:
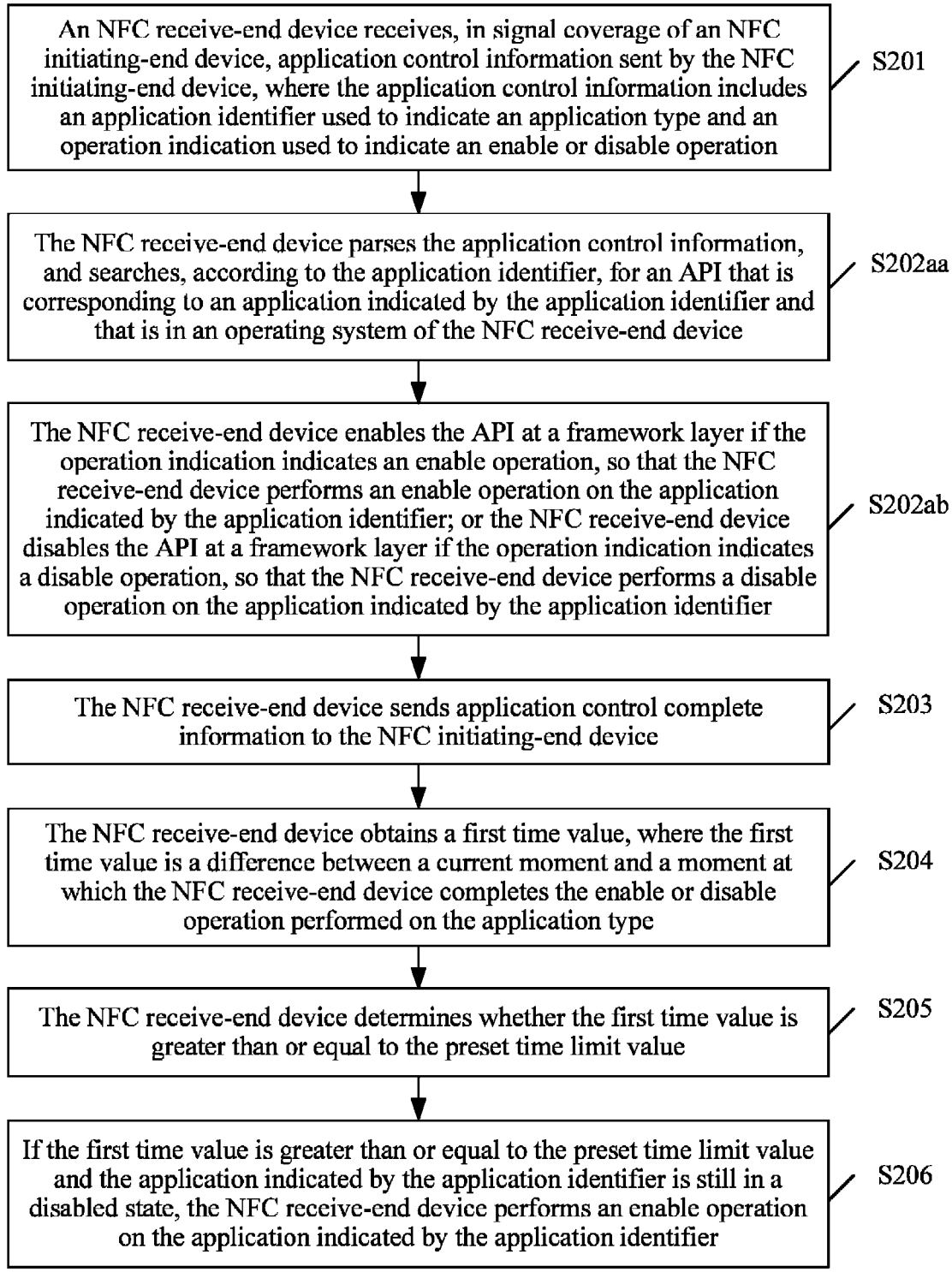
FIG. 3 is a schematic flowchart of a near field communication technology-based terminal application control method according to Embodiment 2 of the present disclosure.

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

This embodiment of the present disclosure provides a near field communication technology-based terminal application control method. As shown in FIG. 2, the near field communication technology-based terminal application control method includes the following steps.

S101. A near field communication (NFC) receive-end device receives, in signal coverage of an NFC initiating-end device, application control information sent by the NFC initiating-end device, where the application control information includes an application identifier used to indicate an application type and an operation indication used to indicate an enable or disable operation.

Specifically, the NFC receive-end device in this embodiment of the present disclosure may be any one of devices such as a mobile phone, a tablet computer, a personal digital assistant (PDA), or a wearable device, and the NFC initiating-end device may be a device that can provide a radio frequency field for an entire communication process, which are not limited in the present disclosure.

It should be noted that in the prior art, when an NFC receive-end device enters some particular areas, the NFC receive-end device can only be switched off temporarily or the NFC receive-end device can only be handed over to a designated person temporarily for keeping. For example, when a user takes an airplane, before the airplane takes off, the user needs to switch off NFC receive-end devices such as a mobile phone and a tablet computer for which a communication function service is enabled, to prevent these NFC receive-end devices from interfering with airplane communication; or when a user enters a meeting room for a meeting, the user needs to manually adjust an NFC receive-end device, such as a mobile phone, that can make a sound, to a vibrate or silent state, to prevent disturbance to the meeting.

Compared with a prior-art method of temporarily switching off an NFC receive-end device or handing an NFC receive-end device over to a designated person for keeping, in the method used in this embodiment of the present disclosure, an NFC receive-end device can receive application control information sent by an NFC initiating-end device, so that an enable or disable operation is performed on the application type according to the application control information sent by the NFC initiating-end device.

It should be noted that the application control information exists in the signal coverage of the NFC initiating-end device in real time. Provided that the NFC receive-end device enters the signal coverage of the NFC initiating-end device, the NFC receive-end device can automatically receive the application control information sent by the NFC initiating-end device. Alternatively, when the NFC receive-end device enters the signal coverage of the NFC initiating-end device, the NFC receive-end device may first interact with the NFC initiating-end device, and then receive the application control information sent by the NFC initiating-end device, which is not limited in the present disclosure.

It should be further noted that the application control information includes the application identifier used to indicate the application type and the operation indication used to indicate an enable or disable operation. One application type can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. If an application type is no data service, an application identifier corresponding to the application type includes a function identifier of a native data service on the NFC receive-end device and further includes a function identifier of third-party software that is installed on the NFC receive-end device and that can connect to the data service.

Further, configuration of the application control information sent by the NFC initiating-end device is already completed, the application control information includes the application identifier used to indicate the application type, and the application identifier indicates at least one application installed on the NFC receive-end device. If an application indicated by the application identifier of the application type is not installed on the NFC receive-end device, the NFC receive-end device performs no subsequent operation after receiving the application control information.

S102. The NFC receive-end device parses the application control information, and performs an enable or disable operation on the application type according to the application identifier and the operation indication.

Specifically, after receiving the application control information sent by the NFC initiating-end device, the NFC receive-end device parses the application control information to obtain the application identifier used to indicate the application type and the operation indication used to indicate an enable or disable operation. The NFC receive-end device performs the enable or disable operation on the application type according to the application identifier and the operation indication.

Specifically, the NFC receive-end device performs, on an application indicated by the application identifier and according to the application control information, the enable or disable operation indicated by the operation indication. For specific implementation of performing, on the application indicated by the application identifier, the enable or disable operation indicated by the operation indication, reference may be made to related descriptions in specific application scenarios in Embodiment 5 of the present disclosure, and details are not described herein in this embodiment of the present disclosure.

This embodiment of the present disclosure provides a near field communication technology-based terminal application control method. An NFC receive-end device receives, in signal coverage of an NFC initiating-end device, application control information sent by the NFC initiating-end device, where the application control information includes an application identifier used to indicate an application type and an operation indication used to indicate an enable or disable operation; and the NFC receive-end device parses the application control information and performs an enable or disable operation on the application type according to the application identifier and the operation indication.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 2

This embodiment of the present disclosure provides a near field communication technology-based terminal application control method. The near field communication technology-based terminal application control method includes the following steps:

S201. An NFC receive-end device receives, in signal coverage of an NFC initiating-end device, application control information sent by the NFC initiating-end device, where the application control information includes an application identifier used to indicate an application type and an operation indication used to indicate an enable or disable operation.

It should be noted that the NFC receive-end device in this embodiment is the same as the NFC receive-end device in Embodiment 1; therefore, for specific descriptions of the NFC receive-end device in this embodiment, reference may be made to related content in Embodiment 1, and details are not described herein.

Compared with a prior-art method of temporarily switching off an NFC receive-end device or handing an NFC receive-end device over to a designated person for keeping, in the method used in this embodiment of the present disclosure, an NFC receive-end device can receive application control information sent by an NFC initiating-end device, so that an enable or disable operation is performed, according to the application control information sent by the NFC initiating-end device, on an application indicated by the application identifier, and then an application type on the NFC receive-end device can be enabled or disabled in different application scenarios.

It should be further noted that the application control information includes the application identifier used to indicate the application type and the operation indication used to indicate an enable or disable operation. One application type can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. If an application type is no data service, an application identifier corresponding to the application type includes a function identifier of a native data service on the NFC receive-end device and further includes a function identifier of third-party software that is installed on the NFC receive-end device and that can connect to the data service.

S202. The NFC receive-end device parses the application control information, and performs an enable or disable operation on the application type according to the application identifier and the operation indication.

Specifically, after receiving the application control information sent by the NFC initiating-end device, the NFC receive-end device parses the application control information to obtain the application identifier used to indicate the application type and the operation indication used to indicate an enable or disable operation. The NFC receive-end device performs, on an application indicated by the application identifier and according to the application identifier and the operation indication, the enable or disable operation indicated by the operation indication.

Specifically, step S202 of performing, by the NFC receive-end device, the enable or disable operation on the application type according to the application identifier and the operation indication may include step S202*a*.

S202*a*. The NFC receive-end device calls a corresponding API in an operating system of the NFC receive-end device according to the application identifier and the operation indication, and performs the enable or disable operation on the application type.

Specifically, as shown in FIG. 3, step S202*a* of performing, by the NFC receive-end device, the enable or disable operation on the application type may include S202*aa* and S202*ab*.

S202*aa*. The NFC receive-end device parses the application control information, and searches, according to the application identifier, for an API that is corresponding to an application indicated by the application identifier and that is in the operating system of the NFC receive-end device.

After parsing the application control information, the NFC receive-end device obtains the application identifier used to indicate the application type and the operation indication used to indicate an enable or disable operation. The NFC receive-end device searches, according to the application identifier, for the API that is corresponding to the application indicated by the application identifier and that is in the operating system of the NFC receive-end device.

It should be noted that one application type is corresponding to one API; therefore, one API can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. All these application identifiers share one API, where the API is located at a framework layer (that is, a Framework Layer) in a system architecture of the NFC receive-end device.

S202*ab*. The NFC receive-end device enables the API at a framework layer if the operation indication indicates an enable operation, so that the NFC receive-end device performs the enable operation on the application indicated by the application identifier; or the NFC receive-end device disables the API at a framework layer if the operation indication indicates a disable operation, so that the NFC receive-end device performs the disable operation on the application indicated by the application identifier.

Specifically, if the operation indication indicates an enable operation, the NFC receive-end device enables the API at the framework layer according to the enable operation indicated by the operation indication, so that the NFC receive-end device performs the enable operation on the application indicated by the application identifier; or if the operation indication indicates a disable operation, the NFC receive-end device disables the API at the framework layer according to the disable operation indicated by the operation indication, so that the NFC receive-end device performs the disable operation on the application indicated by the application identifier.

It should be noted that, because the API is enabled or disabled at the framework layer, the API at the framework layer cannot be called for an application at an application layer any more; therefore, a user cannot manually operate the application any more. The application herein refers to all applications for which the API needs to be called.

Figure 4:
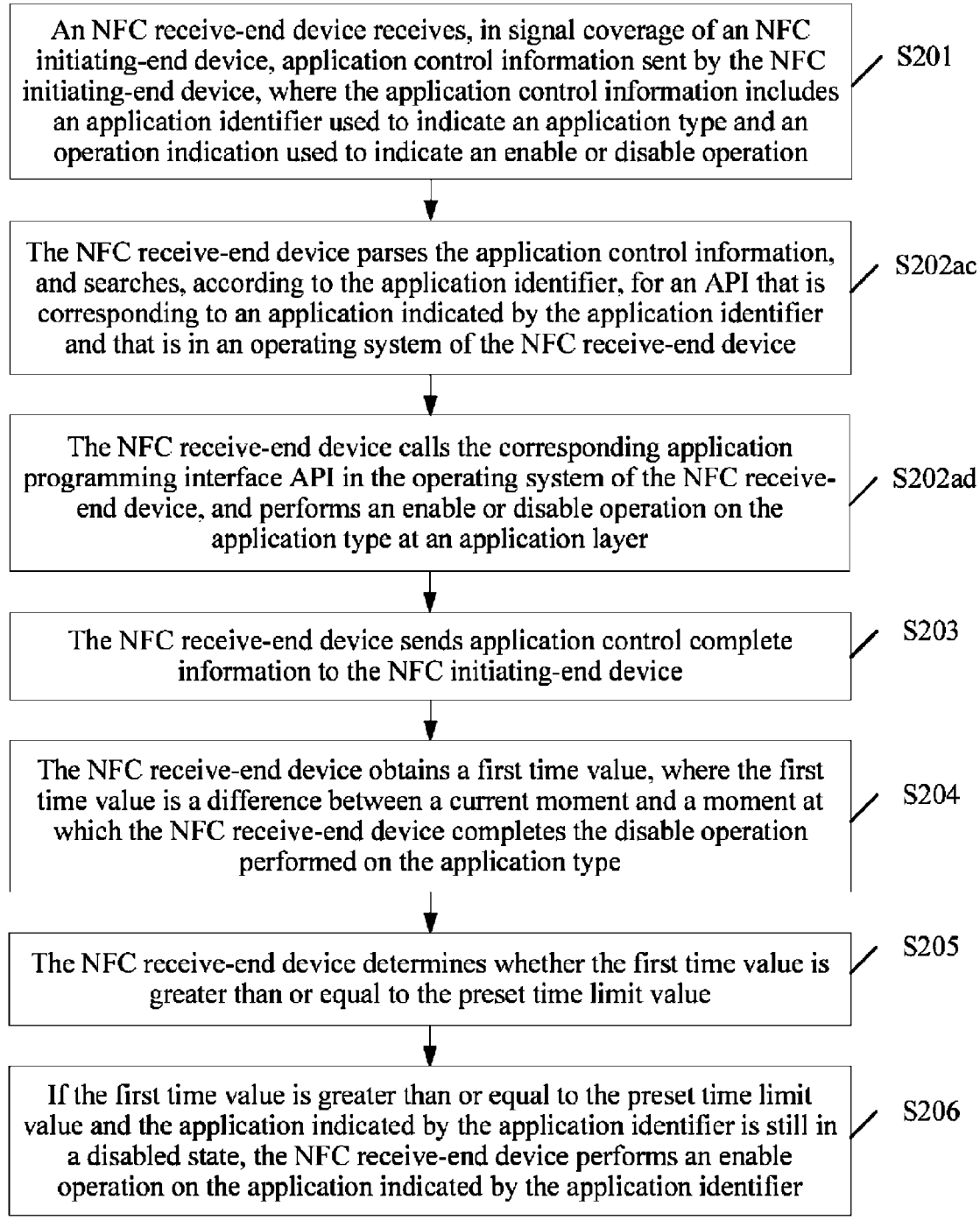
FIG. 4 is a schematic flowchart of another near field communication technology-based terminal application control method according to Embodiment 2 of the present disclosure.

Specifically, alternatively, as shown in FIG. 4, step S202*a* of performing, by the NFC receive-end device, the enable or disable operation on the application type may include S202*ac* and S202*ad*.

S202*ac*. The NFC receive-end device parses the application control information, and searches, according to the application identifier, for an API that is corresponding to an application indicated by the application identifier and that is in the operating system of the NFC receive-end device.

The NFC receive-end device parses the application control information to obtain the application identifier used to indicate the application type and the operation indication used to indicate an enable or disable operation. The NFC receive-end device searches, according to the application identifier, for the API that is corresponding to the application indicated by the application identifier and that is in the operating system of the NFC receive-end device.

It should be noted that one application type is corresponding to one API; therefore, one API can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. All these application identifiers share one API, where the API is located at a framework layer (that is, a Framework Layer) in a system architecture of the NFC receive-end device.

S202ad. The NFC receive-end device calls the corresponding API in the operating system of the NFC receive-end device, and performs the enable or disable operation on the application type at an application layer.

Specifically, the NFC receive-end device calls the corresponding API in the operating system of the NFC receive-end device according to the enable or disable operation indicated by the operation indication, and performs the enable or disable operation on the application type at the application layer.

It should be noted that, because the enable or disable operation is performed on the application type at the application layer, the API at the framework layer can still continue to be called for an application at the application layer; therefore, a user can manually operate the application. The application herein refers to all applications for which the API needs to be called.

Specifically, in an example, a system of the NFC receive-end device is an Android system. A system architecture of the NFC receive-end device is shown in FIG. 5, and layers from the bottom to the top are sequentially a Linux® Kernel, Android® Runtime, Libraries, a Framework Layer, and an Application Layer, where the Linux Kernel is a Linux kernel and is used to provide a core system service based on a Linux operating system, the Android Runtime is a core library set and provides a function of a Java® core class library, the Libraries are C/C++ libraries, the Framework Layer is a framework layer and is an open development platform, and the Application Layer is an application layer and is an application program set. When the NFC receive-end device receives information, the information is transmitted upwards from the bottom layer in the system architecture of the NFC receive-end device. In the near field communication technology-based terminal application control method provided in this embodiment of the present disclosure, at the Framework Layer, a function that the application control information sent by the NFC initiating-end device can be parsed is added, and an API is opened for an NFC service. After receiving the application control information sent by the NFC initiating-end device, the NFC receive-end device parses the application control information, and according to the application identifier and the operation indication, may perform steps S202aa and S202ab to enable or disable the API at the framework layer, or perform S202ac and S202ad to perform the enable or disable operation on the application type at the application layer.

S203. The NFC receive-end device sends application control complete information to the NFC initiating-end device.

The application control complete information is used to indicate that the NFC receive-end device completes the enable or disable operation performed on the application type.

After the NFC receive-end device performs the enable or disable operation on the application type, the NFC receive-end device can further send the application control complete information to the NFC initiating-end device to notify the NFC initiating-end device that the operation is completed.

It should be noted that the NFC receive-end device sends the application control complete information to the NFC initiating-end device, which can make the NFC receive-end device know a time at which the NFC receive-end device completes the enable or disable operation performed on the application type, so that a first time value is calculated subsequently. Specifically, a definition and a calculation method of the first time value are described in detail in the following embodiments, and details are not described herein.

S204. The NFC receive-end device obtains a first time value, where the first time value is a difference between a current time and a time at which the NFC receive-end device completes the enable or disable operation performed on the application type.

The application control information further includes a preset time limit value.

It should be noted that the preset time limit value is a period of time greater than zero.

To prevent a case in which after the NFC receiver device completes the enable or disable operation performed on the application type, a user forgets to perform the enable operation again on the application indicated by the application identifier, for example, in an example, the NFC receive-end device is a mobile phone, when a user enters a laboratory with a secrecy requirement, the mobile phone is changed from a normal state to a no-photo state after the enable or disable operation is performed on the application type in steps S201 to S203 in this embodiment of the present disclosure, and if an API corresponding to a photo/video function is disabled at a framework layer, an application having a photo function makes no response even though the user taps the application. However, if the user forgets to perform the enable operation again on the application indicated by the application identifier after leaving the laboratory, because the application control information further includes the preset time limit value, the NFC receive-end device can perform the enable operation again on the application indicated by the application identifier.

Specifically, the NFC receive-end device obtains the first time value and determines whether the first time value is greater than or equal to the preset time limit value.

The first time value is the difference between the current time and the time at which the NFC receive-end device completes the enable or disable operation performed on the application type.

It should be noted that the preset time value mentioned in this embodiment of the present disclosure may be set by the user according to different scenarios, which is not limited in the present disclosure.

S205. The NFC receive-end device determines whether the first time value is greater than or equal to the preset time limit value.

S206. If the first time value is greater than or equal to the preset time limit value and the application indicated by the application identifier is still in a disabled state, the NFC receive-end device performs an enable operation on the application indicated by the application identifier.

If the first time value is greater than or equal to the preset time limit value and the application indicated by the application identifier is still in the disabled state, it indicates that a time longer than a preset time limit has passed since completion of step S203, and the NFC receive-end device performs the enable operation on the application indicated by the application identifier.

Further, it should be supplemented that in this application scenario, steps S204 to S206 are optional. If the NFC receive-end device has performed, within the preset time limit value, the enable operation on the application indicated by the application identifier, steps S204 to S206 do not need to be performed. Likewise, in an actual application, even if steps S204 to S206 are not performed, an objective of performing the enable operation on the application indicated by the application identifier can also be achieved.

This embodiment of the present disclosure provides a near field communication technology-based terminal application control method. An NFC receive-end device receives application control information sent by an NFC initiating-end device, where the application control information includes an application identifier used to indicate an application type and an operation indication used to indicate an enable or disable operation; and after parsing the application control information, the NFC receive-end device calls a corresponding API in an operating system of the NFC receive-end device according to the application identifier and the operation indication, and performs an enable or disable operation on the application type.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 3

This embodiment of the present disclosure provides a near field communication technology-based terminal application control method. As shown in FIG. 6, the near field communication technology-based terminal application control method includes the following steps.

S301. An NFC initiating-end device obtains application control information, where the application control information includes an application identifier used to indicate an application type and an operation indication used to indicate an enable or disable operation.

It should be noted that the application control information may be sent by an NFC initiating-end management server to the NFC initiating-end device, or may be generated by the NFC initiating-end device, which is not limited in the present disclosure. The application control information includes the application identifier used to indicate the application type and the operation indication used to indicate an enable or disable operation.

S302. The NFC initiating-end device sends the application control information to an NFC receive end when determining that the NFC receive-end device is in signal coverage of the NFC initiating-end device, so that the NFC receive-end device parses the application control information, and performs an enable or disable operation on the application type according to the application identifier and the operation indication.

It should be further noted that the application control information includes the application identifier used to indicate the application type and the operation indication used to indicate an enable or disable operation. One application type can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. If an application type is no data service, an application identifier corresponding to the application type includes a function identifier of a native data service on the NFC receive-end device and further includes a function identifier of third-party software that is installed on the NFC receive-end device and that can connect to the data service.

S303. The NFC initiating-end device receives application control complete information sent by the NFC receive-end device.

After the NFC initiating-end device sends the application control information to the NFC receive-end device, the NFC initiating-end device can further receive the application control complete information sent by the NFC receive-end device.

It should be noted that step S303 is optional. If the NFC receive-end device does not send the application control complete information after performing the enable or disable operation on the application type, step S303 is not performed.

Specifically, a process of how the NFC receive-end device performs the enable or disable operation on the application type is already described in detail in the foregoing embodiment, and details are not described herein.

Further, the application control information further includes a preset time limit value. The preset time limit value is a period of time greater than zero.

This embodiment of the present disclosure provides a near field communication technology-based terminal application control method. An NFC initiating-end device obtains application control information, where the application control information includes an application identifier used to indicate an application type and an operation indication used to indicate an enable or disable operation; and the NFC initiating-end device sends the application control information to an NFC receive-end device, so that after parsing the application control information, the NFC receive-end device calls a corresponding application programming interface API in an operating system of the NFC receive-end device according to the application identifier and the operation indication, and performs an enable or disable operation on the application type.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 4

Figure 7:
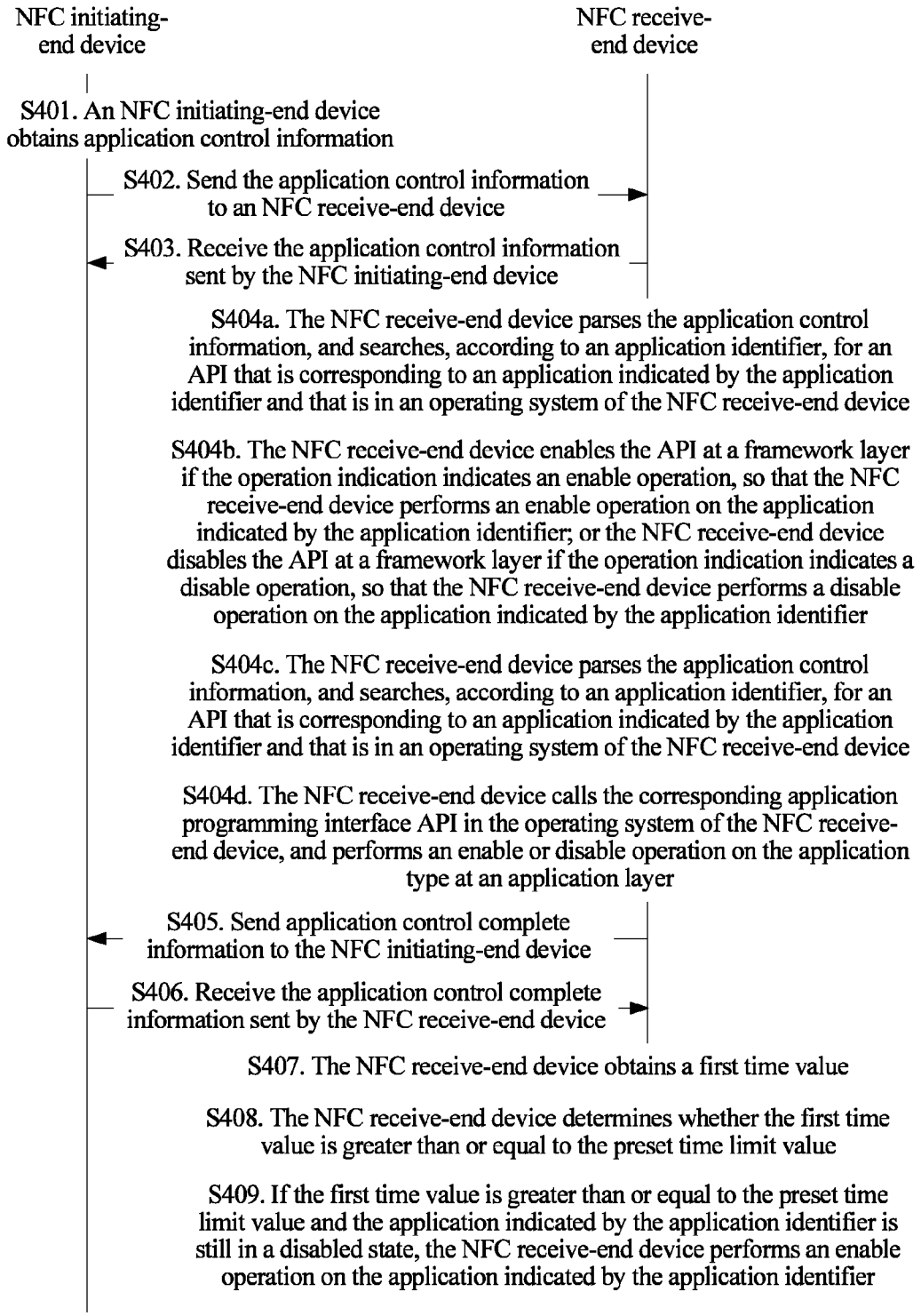
FIG. 7 is a schematic flowchart of a near field communication technology-based terminal application control method according to Embodiment 4 of the present disclosure.

This embodiment of the present disclosure provides a near field communication technology-based terminal application control method. As shown in FIG. 7, the near field communication technology-based terminal application control method includes the following steps.

S401. An NFC initiating-end device obtains application control information.

The application control information includes an application identifier used to indicate an application type and an operation indication used to indicate an enable or disable operation.

It should be noted that the application control information may be sent by an NFC initiating-end management server to the NFC initiating-end device, or may be generated by the NFC initiating-end device, which is not limited in the present disclosure. The application control information includes the application identifier used to indicate the application type and the operation indication used to indicate an enable or disable operation.

S402. The NFC initiating-end device sends the application control information to an NFC receive end when determining that the NFC receive-end device is in signal coverage of the NFC initiating-end device, so that the NFC receive-end device parses the application control information, and performs an enable or disable operation on the application type according to the application identifier and the operation indication.

S403. The NFC receive-end device receives, in the signal coverage of the NFC initiating-end device, the application control information sent by the NFC initiating-end device.

The application control information includes the application identifier used to indicate the application type and the operation indication used to indicate an enable or disable operation. One application type can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. If an application type is no data service, an application identifier corresponding to the application type includes a function identifier of a native data service on the NFC receive-end device and further includes a function identifier of third-party software that is installed on the NFC receive-end device and that can connect to the data service.

S404a. The NFC receive-end device parses the application control information, and searches, according to the application identifier, for an API that is corresponding to an application indicated by the application identifier and that is in an operating system of the NFC receive-end device.

The NFC receive-end device parses the application control information to obtain the application identifier used to indicate the application type and the operation indication used to indicate an enable or disable operation. The NFC receive-end device searches, according to the application identifier, for the API that is corresponding to the application indicated by the application identifier and that is in the operating system of the NFC receive-end device.

It should be noted that one application type is corresponding to one API; therefore, one API can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. All these application identifiers share one API, where the API is located at a framework layer (that is, a Framework Layer) in a system architecture of the NFC receive-end device.

S404b. The NFC receive-end device enables the API at a framework layer if the operation indication indicates an enable operation, so that the NFC receive-end device performs the enable operation on the application indicated by the application identifier; or the NFC receive-end device disables the API at a framework layer if the operation indication indicates a disable operation, so that the NFC receive-end device performs the disable operation on the application indicated by the application identifier.

Specifically, if the operation indication indicates an enable operation, the NFC receive-end device enables the API at the framework layer according to the enable operation indicated by the operation indication, so that the NFC receive-end device performs the enable operation on the application indicated by the application identifier; or if the operation indication indicates a disable operation, the NFC receive-end device disables the API at the framework layer according to the disable operation indicated by the operation indication, so that the NFC receive-end device performs the disable operation on the application indicated by the application identifier.

It should be noted that, because the API is enabled or disabled at the framework layer, the API at the framework layer cannot be called for an application at an application layer any more; therefore, a user cannot manually operate the application any more. The application herein refers to all applications for which the API needs to be called.

S404c. The NFC receive-end device parses the application control information, and searches, according to the application identifier, for an API that is corresponding to an application indicated by the application identifier and that is in an operating system of the NFC receive-end device.

The NFC receive-end device parses the application control information to obtain the application identifier used to indicate the application type and the operation indication used to indicate an enable or disable operation. The NFC receive-end device searches, according to the application identifier, for the API that is corresponding to the application indicated by the application identifier and that is in the operating system of the NFC receive-end device.

It should be noted that one application type is corresponding to one API; therefore, one API can be corresponding to multiple application identifiers. For example, if an application type is no photo/video, an application identifier corresponding to the application type includes a function identifier of a native camera on the NFC receive-end device and further includes a function identifier of third-party software that is installed on the NFC receive-end device and for which the camera needs to be used. All these application identifiers share one API, where the API is located at a framework layer (that is, a Framework Layer) in a system architecture of the NFC receive-end device.

S404d. The NFC receive-end device calls the corresponding API in the operating system of the NFC receive-end device, and performs the enable or disable operation on the application type at an application layer.

Specifically, the NFC receive-end device calls the corresponding API in the operating system of the NFC receive-end device according to the enable or disable operation indicated by the operation indication, and performs the enable or disable operation on the application type at the application layer.

It should be noted that, because the enable or disable operation is performed on the application type at the application layer, the API at the framework layer can still continue to be called for an application at the application layer; therefore, a user can manually operate the application. The application herein refers to all applications for which the API needs to be called.

S405. The NFC receive-end device sends application control complete information to the NFC initiating-end device.

S406. The NFC initiating-end device receives the application control complete information sent by the NFC receive-end device.

After the NFC initiating-end device sends the application control information to the NFC receive-end device, the NFC initiating-end device can further receive the application control complete information sent by the NFC receive-end device.

S407. The NFC receive-end device obtains a first time value.

The first time value is a difference between a current time and a time at which the NFC receive-end device completes the enable or disable operation performed on the application type.

The application control information further includes a preset time limit value.

S408. The NFC receive-end device determines whether the first time value is greater than or equal to the preset time limit value.

Specifically, the NFC receive-end device obtains the first time value and determines whether the first time value is greater than or equal to the preset time limit value.

The first time value is the difference between the current time and the time at which the NFC receive-end device completes the enable or disable operation performed on the application type.

It should be noted that the preset time value mentioned in this embodiment of the present disclosure may be set by the user according to different scenarios, which is not limited in the present disclosure.

S409. If the first time value is greater than or equal to the preset time limit value and the application indicated by the application identifier is still in a disabled state, the NFC receive-end device performs an enable operation on the application indicated by the application identifier.

If the first time value is greater than or equal to the preset time limit value and the application indicated by the application identifier is still in the disabled state, it indicates that a time longer than a preset time limit has passed since completion of step S203, and the NFC receive-end device performs the enable operation on the application indicated by the application identifier.

Further, it should be supplemented that in this application scenario, steps S407 to S409 are optional. If the NFC receive-end device has performed, within the preset time limit value, the enable operation on the application indicated by the application identifier, steps S407 to S409 do not need to be performed. Likewise, in an actual application, even if steps S407 to S409 are not performed, an objective of performing the enable operation on the application indicated by the application identifier can also be achieved.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 5

To assist a person skilled in the art in understanding the technical solutions in the present disclosure, the following describes the solutions in the present disclosure by using the following specific instances.

User equipment in this embodiment of the present disclosure may be an electronic device such as a mobile phone or a tablet computer. The following takes a mobile phone as an example to describe implementation manners of the solutions in several different application scenarios.

Application Scenario 1

When a user takes an airplane, the user needs to disable a data communication function of a mobile phone. The solutions provided in the embodiments of the present disclosure are applied. An NFC initiating-end device receives application control information that is sent by an NFC initiating-end management server to the NFC initiating-end device or an NFC initiating-end device generates application control information, where the application control information includes an application identifier used to indicate an application type and an operation indication used to indicate an enable or disable operation, that is, an application identifier used to indicate the data communication function and an operation indication used to indicate a disable operation. When the user boards the airplane, the mobile phone enters coverage of the NFC initiating-end device, and receives the application control information sent by the NFC initiating-end device.

The mobile phone parses the application control information, opens an API for an NFC service, and searches for an API that is corresponding to an application indicated by the application identifier and that is in an operating system of the mobile phone, that is, an API corresponding to the data communication function. The mobile phone calls the corresponding application programming interface API in the operating system of the mobile phone according to the application identifier and the operation indication, performs a disable operation on the application type, disables the data communication function of the mobile phone, and sends application control complete information to the terminal. The performing a disable operation on the application type mentioned herein may be disabling the API at a framework layer, or may be performing the disable operation on the application type at an application layer.

When the user gets off the airplane for leaving an airport, the mobile phone enters the coverage of the NFC initiating-end device again and receives application control information sent by the NFC initiating-end device. In this case, the application control information includes the application identifier used to indicate the data communication function and an operation indication used to indicate an enable operation. The mobile phone parses the application control information, opens the API for the NFC service, and searches for the API that is corresponding to the application indicated by the application identifier and that is in the operating system of the mobile phone, that is, the API corresponding to the data communication function. The mobile phone calls the corresponding API in the operating system of the mobile phone according to the application identifier and the operation indication, performs an enable operation on the application type, enables the data communication function of the mobile phone, and sends application control complete information to the terminal.

If the user does not enter the coverage of the NFC initiating-end device when leaving the airport, and consequently, the mobile phone does not re-enable the data communication function of the mobile phone, the mobile phone obtains a first time value and determines whether the first time value is greater than or equal to the preset time limit value. For example, the first time value is 25 hours, and the preset time limit value is 24 hours. In this case, the mobile phone performs an enable operation on the application indicated by the application identifier and re-enables the data communication function of the mobile phone.

Application Scenario 2

When a user is in a meeting, the user needs to adjust a mobile phone to vibration or silence, that is, disable a ringing function of the mobile phone. The solutions provided in the embodiments of the present disclosure are applied. An NFC initiating-end device receives application control information that is sent by an NFC initiating-end management server to the NFC initiating-end device or an NFC initiating-end device generates application control information, where the application control information includes an application identifier used to indicate an application type and an operation indication used to indicate an enable or disable operation, that is, an application identifier used to indicate the ringing function and an operation indication used to indicate a disable operation. When the user enters a meeting room, the mobile phone enters coverage of the NFC initiating-end device, and receives the application control information sent by the NFC initiating-end device.

The mobile phone parses the application control information, opens an API for an NFC service, and searches for an API that is corresponding to an application indicated by the application identifier and that is in an operating system of the mobile phone, that is, an API corresponding to the ringing function. The mobile phone calls the corresponding application programming interface API in the operating system of the mobile phone according to the application identifier and the operation indication, performs a disable operation on the application type, disables the ringing function of the mobile phone, and sends application control complete information to the terminal. The performing a disable operation on the application type mentioned herein may be disabling the API at a framework layer, or may be performing the disable operation on the application type at an application layer.

When the user leaves the meeting room, the mobile phone enters the coverage of the NFC initiating-end device again and receives application control information sent by the NFC initiating-end device. In this case, the application control information includes the application identifier used to indicate the ringing function and an operation indication used to indicate an enable operation. The mobile phone parses the application control information, opens the API for the NFC service, and searches for the API that is corresponding to the application indicated by the application identifier and that is in the operating system of the mobile phone, that is, the API corresponding to the ringing function. The mobile phone calls the corresponding application programming interface API in the operating system of the mobile phone according to the application identifier and the operation indication, performs an enable operation on the application type, enables the ringing function of the mobile phone, and sends application control complete information to the terminal.

If the user does not enter the coverage of the NFC initiating-end device when leaving the meeting room, and consequently, the mobile phone does not re-enable the ringing function of the mobile phone, the mobile phone obtains a first time value and determines whether the first time value is greater than or equal to the preset time limit value. For example, the first time value is 2.5 hours, and the preset time limit value is 2 hours. In this case, the mobile phone performs an enable operation on the application indicated by the application identifier and re-enables the ringing function of the mobile phone.

Application Scenario 3

When a user enters a place (for example, a national key science and research laboratory) with a secrecy requirement, the user needs to disable a camera function of a mobile phone. The solutions provided in the embodiments of the present disclosure are applied: An NFC initiating-end device receives application control information that is sent by an NFC initiating-end management server to the NFC initiating-end device or an NFC initiating-end device generates application control information, where the application control information includes an application identifier used to indicate an application type and an operation indication used to indicate an enable or disable operation, that is, an application identifier used to indicate the camera function and an operation indication used to indicate a disable operation. When the user enters a meeting room, the mobile phone enters coverage of the NFC initiating-end device, and receives the application control information sent by the NFC initiating-end device.

The mobile phone parses the application control information, opens an API for an NFC service, and searches for an API that is corresponding to an application indicated by the application identifier and that is in an operating system of the mobile phone, that is, an API corresponding to the camera function. The mobile phone calls the corresponding API in the operating system of the mobile phone according to the application identifier and the operation indication, performs a disable operation on the application type, disables the camera function of the mobile phone, and sends application control complete information to the terminal. The performing, on the application indicated by the application identifier, the disable operation indicated by the operation indication mentioned herein may be disabling the API at a framework layer, or may be performing the disable operation on the application type at an application layer.

When the user leaves the place, the mobile phone enters the coverage of the NFC initiating-end device again and receives application control information sent by the NFC initiating-end device. In this case, the application control information includes the application identifier used to indicate the camera function and an operation indication used to indicate an enable operation. The mobile phone parses the application control information, opens the API for the NFC service, and searches for the API that is corresponding to the application indicated by the application identifier and that is in the operating system of the mobile phone, that is, the API corresponding to the camera function. The mobile phone calls the corresponding API in the operating system of the mobile phone according to the application identifier and the operation indication, performs an enable operation on the application type, enables the camera function of the mobile phone, and sends application control complete information to the terminal.

If the user does not enter the coverage of the NFC initiating-end device when leaving the place, and consequently, the mobile phone does not re-enable the camera function of the mobile phone, the mobile phone obtains a first time value and determines whether the first time value is greater than or equal to the preset time limit value. For example, the first time value is 5 hours, and the preset time limit value is 3 hours. In this case, the mobile phone performs an enable operation on the application indicated by the application identifier and re-enables the camera function of the mobile phone.

It should be noted that application control information (for example, disabling an application function or enabling an application function) that is sent by an NFC initiating-end device and that is received by an NFC receive-end device after the NFC receive-end device enters coverage of the NFC initiating-end device may be sent by a same NFC initiating-end device, or may be sent by different NFC initiating-end devices, which is not limited in the present disclosure.

It should be supplemented that the near field communication technology-based terminal application control methods provided in the embodiments of the present disclosure are applicable to, but not limited to, the foregoing three application scenarios, and are also applicable to many special occasions with secrecy and security requirements and the like, which is not limited in the present disclosure.

It should be further noted that in a case in which an NFC receive-end device and an NFC initiating-end device can make a convention, the NFC receive-end device and the NFC initiating-end device may set security classifications for different application types, and an enable or disable operation is performed on the application types in a manner of changing a security classification.

Embodiment 6

Figure 8:
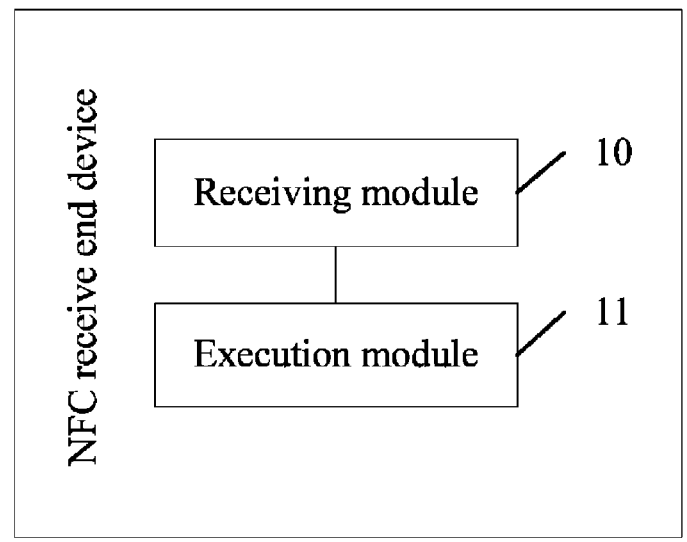
FIG. 8 is a schematic structural diagram 1 of an NFC receive-end device according to Embodiment 6 of the present disclosure.

This embodiment of the present disclosure provides an NFC receive-end device. As shown in FIG. 8, the NFC receive-end device includes a receiving module 10 and an execution module 11.

The receiving module 10 is configured to receive, in signal coverage of an NFC initiating-end device, application control information sent by the NFC initiating-end device, where the application control information includes an application identifier used to indicate an application type and an operation indication used to indicate an enable or disable operation.

The execution module 11 is configured to parse the application control information, and perform an enable or disable operation on the application type according to the application identifier and the operation indication.

Figure 9:
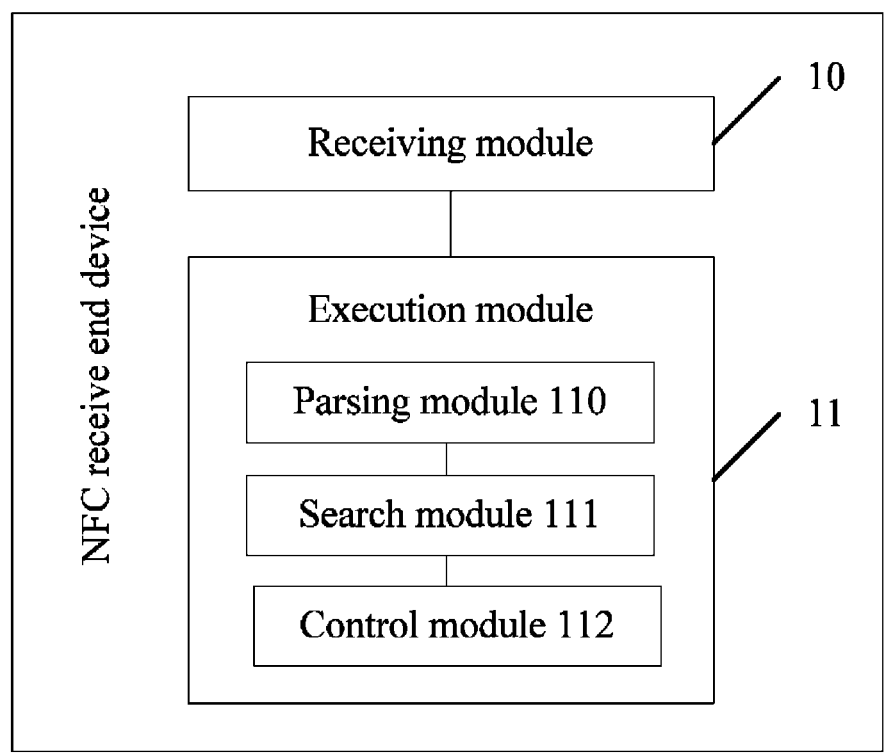
FIG. 9 is a schematic structural diagram 2 of an NFC receive-end device according to Embodiment 6 of the present disclosure.

Further, the execution module is specifically configured to: call a corresponding API in an operating system of the NFC receive-end device according to the application identifier and the operation indication, and perform the enable or disable operation on the application type. As shown in FIG. 9, the execution module 11 includes a parsing module 110, configured to parse the application control information; a search module 111, configured to search, according to the application identifier after the parsing module 110 parses the application control information, for an API that is corresponding to an application indicated by the application identifier and that is in the operating system of the NFC receive-end device; and a control module 112, configured to enable the API at a framework layer if the operation indication indicates an enable operation, so that the NFC receive-end device performs the enable operation on the application indicated by the application identifier; or disable the API at a framework layer if the operation indication indicates a disable operation, so that the NFC receive-end device performs the disable operation on the application indicated by the application identifier.

Further, the execution module 11 includes the parsing module 110, configured to parse the application control information; the search module 111, configured to search, according to the application identifier after the parsing module 110 parses the application control information, for an API that is corresponding to an application indicated by the application identifier and that is in the operating system of the NFC receive-end device; and the control module 112, further configured to call the corresponding application programming interface API in the operating system of the NFC receive-end device, and perform the enable or disable operation on the application type at an application layer.

Figure 10:
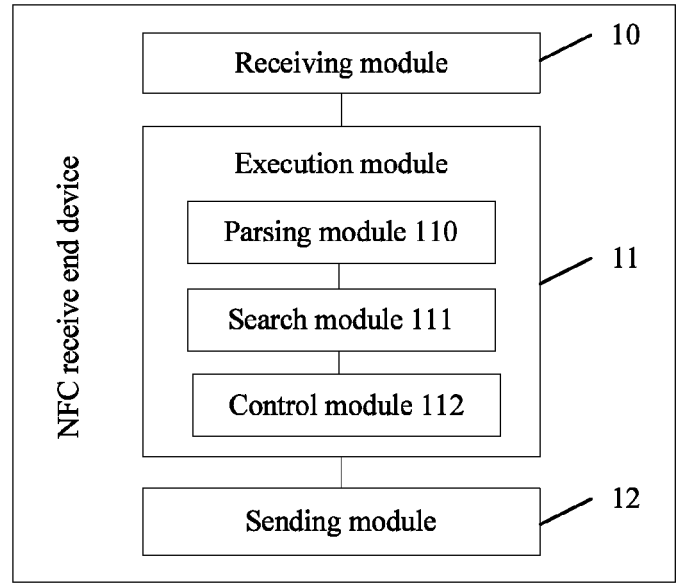
FIG. 10 is a schematic structural diagram 3 of an NFC receive-end device according to Embodiment 6 of the present disclosure.

Further, as shown in FIG. 10, the NFC receive-end device further includes a sending module 12, configured to send application control complete information to the NFC initiating-end device after the execution module 11 performs the enable or disable operation on the application type, where the application control complete information is used to indicate that the NFC receive-end device completes the enable or disable operation performed on the application type.

Further, the application control information further includes a preset time limit value.

Figure 11:
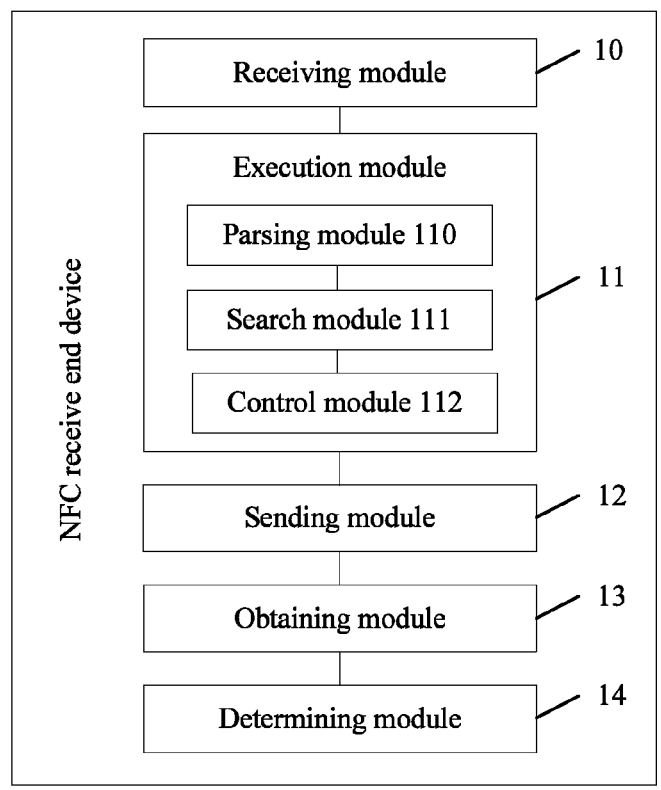
FIG. 11 is a schematic structural diagram 4 of an NFC receive-end device according to Embodiment 6 of the present disclosure.

As shown in FIG. 11, the NFC receive-end device further includes an obtaining module 13, configured to obtain a first time value after the execution module 11 performs the enable or disable operation on the application type, where the first time value is a difference between a current time and a time at which the execution module completes the disable operation performed on the application type; and a determining module 14, configured to determine whether the first time value is greater than or equal to the preset time limit value.

The execution module 11 is further configured to, if the first time value is greater than or equal to the preset time limit value and the application indicated by the application identifier is still in a disabled state, perform an enable operation on the application indicated by the application identifier.

This embodiment of the present disclosure provides an NFC receive-end device, and the NFC receive-end device includes a receiving module, configured to receive application control information sent by an NFC initiating-end device, where the application control information includes an application identifier used to indicate an application type and an operation indication used to indicate an enable or disable operation; and an execution module, configured to parse the application control information, and after parsing the application control information, call a corresponding API in an operating system of the NFC receive-end device according to the application identifier and the operation indication, and perform an enable or disable operation on the application type.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 7

Figure 12:
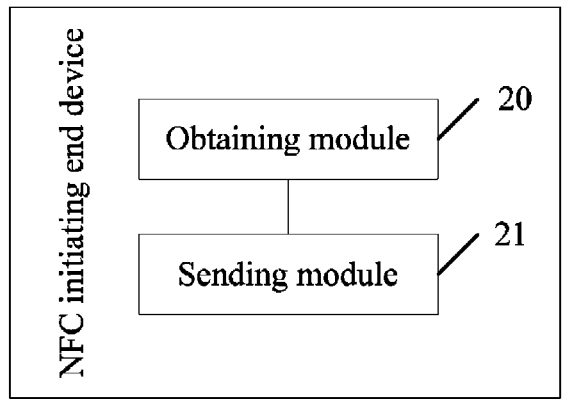
FIG. 12 is a schematic structural diagram 1 of an NFC initiating-end device according to Embodiment 7 of the present disclosure.

This embodiment of the present disclosure provides an NFC initiating-end device. As shown in FIG. 12, the NFC initiating-end device includes an obtaining module 20 and a sending module 21.

The obtaining module 20 is configured to obtain application control information, where the application control information includes an application identifier used to indicate an application type and an operation indication used to indicate an enable or disable operation.

The sending module 21 is configured to send the application control information to an NFC receive end when it is determined that the NFC receive-end device is in signal coverage of the NFC initiating-end device, so that the NFC receive-end device parses the application control information, and performs an enable or disable operation on the application type according to the application identifier and the operation indication.

Figure 13:
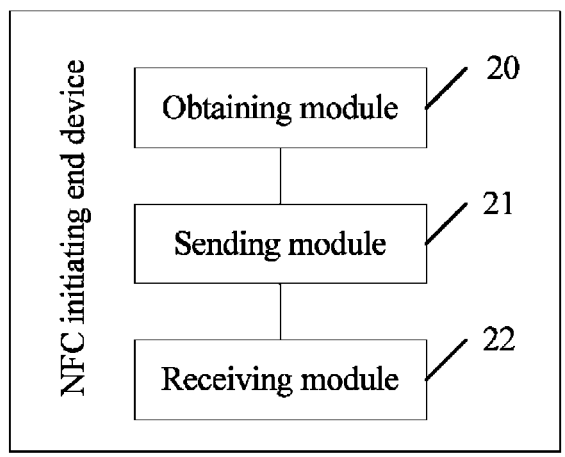
FIG. 13 is a schematic structural diagram 2 of an NFC initiating-end device according to Embodiment 7 of the present disclosure.

Further, as shown in FIG. 13, the NFC initiating-end device further includes a receiving module 22, configured to, after the sending module 21 sends the application control information to the NFC receive-end device, receive application control complete information sent by the NFC receive-end device, where the application control complete information is used to indicate that the NFC receive-end device completes the enable or disable operation performed on the application type.

Further, the application control information further includes a preset time limit value.

This embodiment of the present disclosure provides an NFC initiating-end device, and the NFC initiating-end device includes an obtaining module, configured to obtain application control information, where the application control information includes an application identifier used to indicate an application type and an operation indication used to indicate an enable or disable operation; and a sending module, configured to send the application control information to an NFC receive-end device, so that after parsing the application control information, the NFC receive-end device calls a corresponding API in an operating system of the NFC receive-end device according to the application identifier and the operation indication, and performs an enable or disable operation on the application type.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 8

Figure 14:
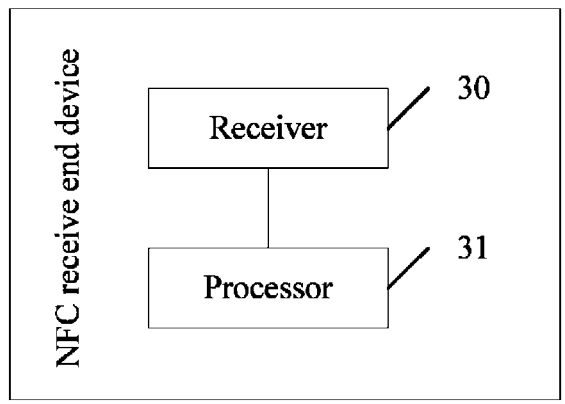
FIG. 14 is a schematic structural diagram 1 of an NFC receive-end device according to Embodiment 8 of the present disclosure.

This embodiment of the present disclosure provides an NFC receive-end device. As shown in FIG. 14, the NFC receive-end device includes a receiver 30 and a processor 31.

The receiver 30 is configured to receive, in signal coverage of an NFC initiating-end device, application control information sent by the NFC initiating-end device, where the application control information includes an application identifier used to indicate an application type and an operation indication used to indicate an enable or disable operation.

The processor 31 is configured to parse the application control information, and perform an enable or disable operation on the application type according to the application identifier and the operation indication.

Further, the processor 31 is configured to parse the application control information; search, according to the application identifier after the processor 31 parses the application control information, for an API that is corresponding to an application indicated by the application identifier and that is in an operating system of the NFC receive-end device; and enable the API at a framework layer if the operation indication indicates an enable operation, so that the NFC receive-end device performs the enable operation on the application indicated by the application identifier; or disable the API at a framework layer if the operation indication indicates a disable operation, so that the NFC receive-end device performs the disable operation on the application indicated by the application identifier.

Further, the processor 31 is configured to parse the application control information; search, according to the application identifier after the processor 31 parses the application control information, for an API that is corresponding to an application indicated by the application identifier and that is in an operating system of the NFC receive-end device; call the corresponding API in the operating system of the NFC receive-end device; and perform the enable or disable operation on the application type at an application layer.

Figure 15:
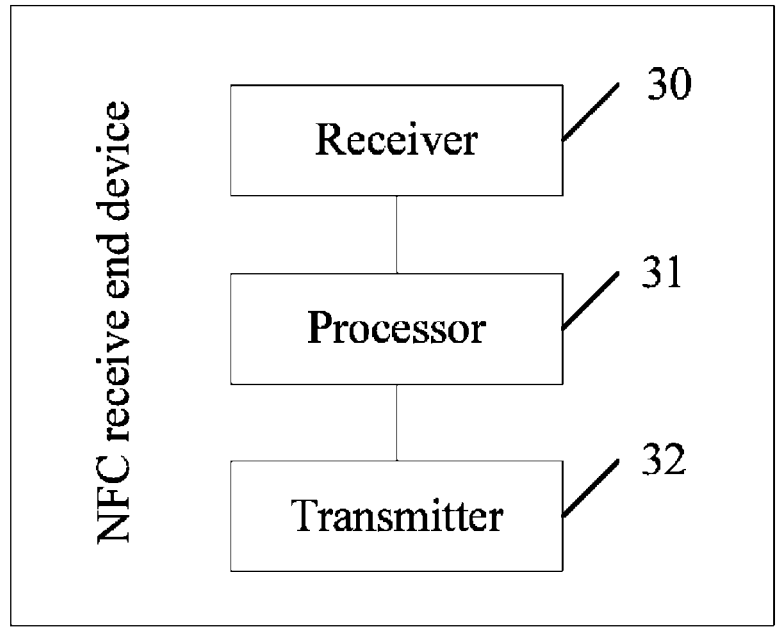
FIG. 15 is a schematic structural diagram 2 of an NFC receive-end device according to Embodiment 8 of the present disclosure.

Further, as shown in FIG. 15, the NFC receive-end device further includes a transmitter 32, configured to send application control complete information to the NFC initiating-end device after the processor 31 performs the enable or disable operation on the application type.

Further, the application control information further includes a preset time limit value.

The receiver 30 is further configured to obtain a first time value after the processor 31 performs the enable or disable operation on the application type, where the first time value is a difference between a current time and a time at which the processor completes the enable or disable operation performed on the application type.

The processor 31 is further configured to determine whether the first time value is greater than or equal to the preset time limit value; and if the first time value is greater than or equal to the preset time limit value and the application indicated by the application identifier is still in a disabled state, perform an enable operation on the application indicated by the application identifier.

This embodiment of the present disclosure provides an NFC receive-end device, and the NFC receive-end device includes a receiver, configured to receive application control information sent by an NFC initiating-end device, where the application control information includes an application identifier used to indicate an application type and an operation indication used to indicate an enable or disable operation; and a processor, configured to: parse the application control information, and after parsing the application control information, call a corresponding API in an operating system of the NFC receive-end device according to the application identifier and the operation indication, and perform an enable or disable operation on the application type.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 9

Figure 16:
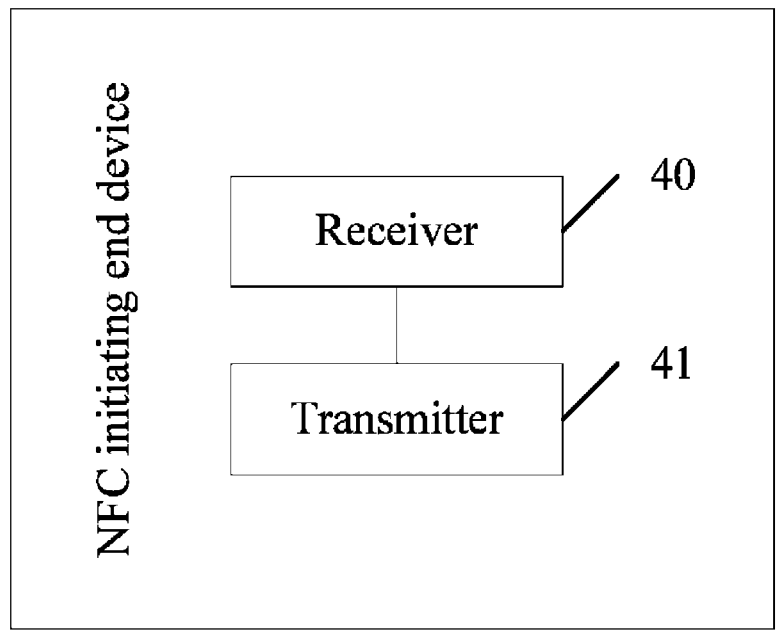
FIG. 16 is a schematic structural diagram of an NFC initiating-end device according to Embodiment 9 of the present disclosure.

This embodiment of the present disclosure provides an NFC initiating-end device. As shown in FIG. 16, the NFC initiating-end device includes a receiver 40 and a transmitter 41.

The receiver 40 is configured to obtain application control information, where the application control information includes an application identifier used to indicate an application type and an operation indication used to indicate an enable or disable operation.

The transmitter 41 is configured to send the application control information to an NFC receive end when it is determined that the NFC receive-end device is in signal coverage of the NFC initiating-end device, so that the NFC receive-end device parses the application control information, and performs an enable or disable operation on the application type according to the application identifier and the operation indication.

Further, the receiver 40 is further configured to, after the transmitter sends the application control information to the NFC receive-end device, receive application control complete information sent by the NFC receive-end device, where the application control complete information is used to indicate that the NFC receive-end device completes the enable or disable operation performed on the application type.

Further, the application control information further includes a preset time limit value.

This embodiment of the present disclosure provides an NFC initiating-end device, and the NFC initiating-end device includes a receiver, configured to obtain application control information, where the application control information includes an application identifier used to indicate an application type and an operation indication used to indicate an enable or disable operation; and a transmitter, configured to send the application control information to an NFC receive-end device, so that after parsing the application control information, the NFC receive-end device calls a corresponding API in an operating system of the NFC receive-end device according to the application identifier and the operation indication, and performs an enable or disable operation on the application type.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 10

This embodiment of the present disclosure provides a near field communication technology-based terminal application control system, including the NFC receive-end device described in Embodiment 6 and the NFC initiating-end device described in Embodiment 7.

Figure 17:
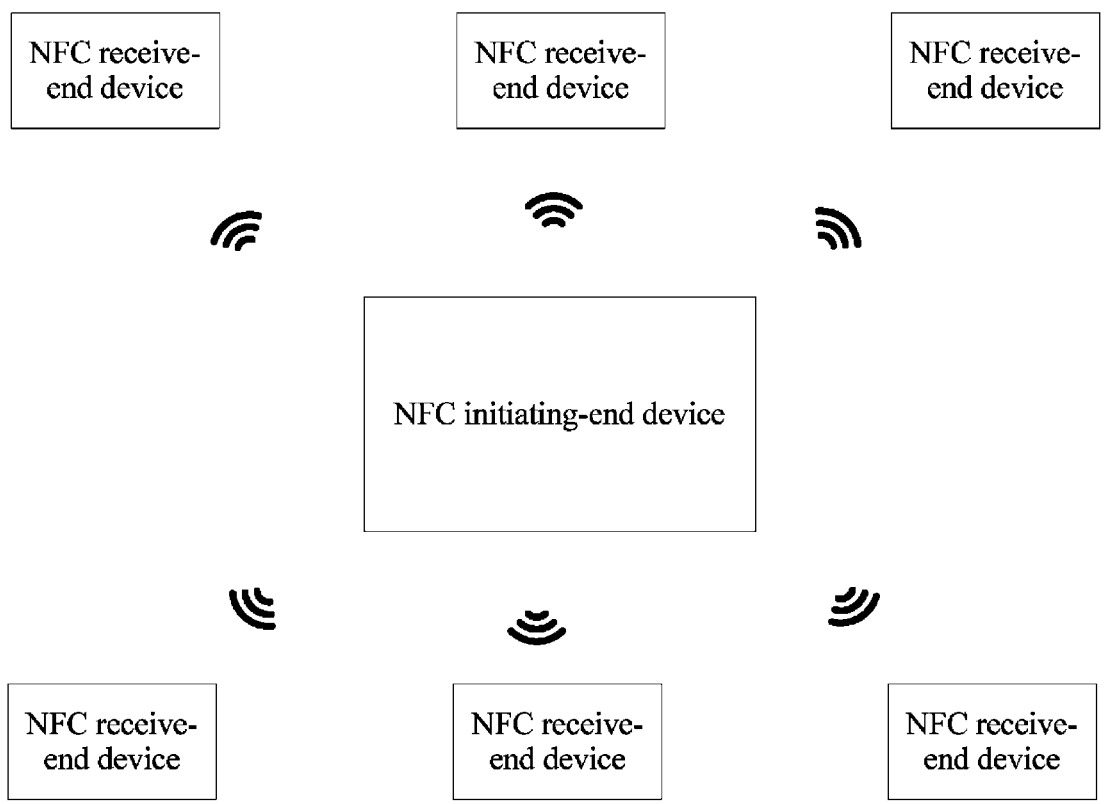
FIG. 17 is a schematic diagram of a networking manner according to an embodiment of the present disclosure.

Specifically, in the near field communication technology-based terminal application control system provided in this embodiment of the present disclosure, one NFC initiating-end device may interact with multiple NFC receive-end device simultaneously, and a networking manner of the system is shown in FIG. 17.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

Embodiment 11

This embodiment of the present disclosure provides a near field communication technology-based terminal application control system, including the NFC receive-end device described in Embodiment 8 and the NFC initiating-end device described in Embodiment 9.

Based on descriptions of the foregoing embodiment, in the present disclosure, an NFC receive-end device can receive application control information sent by an NFC initiating-end device, where the application control information includes an application identifier used to indicate an application type and an operation indication used to indicate an enable or disable operation, so that the NFC receive-end device calls a corresponding API in an operating system of the NFC receive-end device according to the application identifier and the operation indication that are obtained by parsing the application control information, and performs an enable or disable operation on the application type. Further, an enable (Enable) or disable (Disable) operation can be performed intelligently on a particular application on all mobile terminals (that is, NFC receive-end devices) in signal coverage of the NFC initiating-end device, instead of requiring a user to switch off a mobile phone or directly confiscating a mobile phone in the prior art, thereby increasing operating efficiency of a mobile terminal.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for near field communication (NFC) technology-based terminal application control, the method comprising:
receiving, by an NFC receive-end device in signal coverage of an NFC initiating-end device, application control information from the NFC initiating-end device, wherein the application control information comprises each of an application identifier indicating an application type, an operation indication indicating either an enable or a disable operation, and a preset time limit value;

parsing, by the NFC receive-end device, the application control information;

performing an enable operation or a disable operation on the application type according to the application identifier and the operation indication;

obtaining, by the NFC receive-end device, a first time value comprising a difference between a current time and a second time, wherein the second time is a later time where the NFC receive-end device completes either the enable operation or the disable operation on the application type;

determining, by the NFC receive-end device, whether the first time value is at least equal to the preset time limit value; and performing, by the NFC receive-end device, the enable operation on the application type according to the application identifier when both of the first time value is at least equal to the preset time limit value and the application type corresponding to the application identifier is in a disabled state.

2. The method according to claim 1, wherein parsing the application control information and performing the enable operation or the disable operation comprises:

calling, by the NFC receive-end device, a corresponding application programming interface (API) in an operating system of the NFC receive-end device according to the application identifier and the operation indication; and performing either the enable or disable operation on the application type.

3. The method according to claim 2, wherein parsing the application control information, calling the corresponding API, and performing either the enable operation or the disable operation on the application type comprises:

parsing, by the NFC receive-end device, the application control information;

searching, according to the application identifier, for an API that corresponds to the application type indicated by the application identifier and that is in the operating system of the NFC receive-end device; and enabling, by the NFC receive-end device, the API at a framework layer when the operation indication indicates an enable operation, so that the NFC receive-end device performs the enable operation on the application type indicated by the application identifier.

4. The method according to claim 2, wherein parsing the application control information, calling the corresponding API, and either performing the enable operation or the disable operation on the application type comprises:

parsing, by the NFC receive-end device, the application control information;

searching, according to the application identifier, for an API that corresponds to the application type indicated by the application identifier and that is in the operating system of the NFC receive-end device;

calling, by the NFC receive-end device, the corresponding API in the operating system of the NFC receive-end device; and performing, at an application layer on the application type indicated by the application identifier, either the enable operation or the disable operation indicated by the operation indication.

5. The method according to claim 2, wherein parsing the application control information, calling the corresponding API, and performing either the enable operation or the disable operation on the application type comprises:

parsing, by the NFC receive-end device, the application control information;

searching, according to the application identifier, for an API that corresponds to the application type indicated by the application identifier in the operating system of the NFC receive-end device; and disabling, by the NFC receive-end device, the API at a framework layer when the operation indication indicates a disable operation, so that the NFC receive-end device performs the disable operation on the application type indicated by the application identifier.

6. The method according to claim 1, wherein after performing either the enable operation or the disable operation, the method further comprises sending, by the NFC receive-end device, application control complete information to the NFC initiating-end device, and wherein the application control complete information indicates that the NFC receive-end device completed either the enable or the disable operation on the application type.

7. A method for near field communication (NFC) technology-based terminal application control, comprising:

obtaining, by an NFC initiating-end device, application control information, wherein the application control information comprises each of an application identifier corresponding to an application type and an operation indication indicating either an enable or a disable operation;

sending, by the NFC initiating-end device, the application control information to an NFC receive-end device when the NFC receive-end device is in signal coverage of the NFC initiating-end device; and receiving, by the NFC initiating-end device, application control complete information from the NFC receive-end device, wherein the application control complete information indicates the NFC receive-end device has completed either the enable operation or the disable operation on the application type.

8. The method according to claim 7, wherein the application control information further comprises a preset time limit value.

9. A near field communication (NFC) receive-end device, comprising:

a processor; and a receiver coupled to the processor and configured to receive, in signal coverage with an NFC initiating-end device, application control information from the NFC initiating-end device, wherein the application control information comprises each of an application identifier indicating an application type, an operation indication indicating an enable or disable operation, and a preset time limit value, wherein the receiver is configured to obtain a first time value after either the enable operation or the disable operation is performed on the application type, and wherein the processor is configured to:

parse the application control information;

determine whether the first time value is greater than or equal to a preset time limit value; and perform the enable operation on the application type according to the application identifier when the first time value is greater than or equal to the preset time limit value and when an application type indicated by the application identifier is still in a disabled state, wherein the first time value is a difference between a current time and a second time where the processor completes either the enable or the disable operation on the application type.

10. The NFC receive-end device according to claim 9, wherein the processor is further configured to:
- call a corresponding application programming interface (API) in an operating system of the NFC receive-end device according to the application identifier and the operation indication; and
- perform either the enable operation or the disable operation on the application type.

11. The NFC receive-end device according to claim 10, wherein the processor is further configured to:
- parse the application control information;
- search, according to the application identifier, for an API that corresponds to the application type indicated by the application identifier and that is in the operating system of the NFC receive-end device; and
- enable the API at a framework layer when the operation indication indicates an enable operation, so that the NFC receive-end device performs the enable operation on the application type indicated by the application identifier.

12. The NFC receive-end device according to claim 10, wherein the processor is further configured to:
- parse the application control information;
- search, according to the application identifier, for the API that corresponds to the application type indicated by the application identifier and that is in the operating system of the NFC receive-end device;
- call the corresponding API in the operating system of the NFC receive-end device; and
- perform either the enable operation or the disable operation on the application type at an application layer.

13. The NFC receive-end device according to claim 10, wherein the processor is further configured to:
- parse the application control information;
- search, according to the application identifier, for an API that corresponds to the application type indicated by the application identifier and that is in the operating system of the NFC receive-end device; and
- disable the API at a framework layer when the operation indication indicates a disable operation, so that the NFC receive-end device performs the disable operation on the application type indicated by the application identifier.

14. The NFC receive-end device according to claim 9, further comprising a transmitter coupled to the processor and configured to send application control complete information to the NFC initiating-end device after the processor performs either the enable operation or the disable operation on the application type, wherein the application control complete information indicates that the NFC receive-end device has completed either the enable or disable operation performed on the application type.

* * * * *